April 24, 1956 — A. ERNST — 2,742,781
APPARATUS FOR MEASURING HARDNESS OF METALS
Filed Nov. 26, 1951 — 2 Sheets-Sheet 1

INVENTOR
ALFRED ERNST
BY
Greene, Pinelis & Durr
ATTORNEYS

April 24, 1956  A. ERNST  2,742,781
APPARATUS FOR MEASURING HARDNESS OF METALS
Filed Nov. 26, 1951  2 Sheets-Sheet 2

INVENTOR
ALFRED ERNST
ATTORNEYS

United States Patent Office 2,742,781
Patented Apr. 24, 1956

2,742,781
APPARATUS FOR MEASURING HARDNESS OF METALS

Alfred Ernst, Milan, Italy

Application November 26, 1951, Serial No. 258,207

7 Claims. (Cl. 73—83)

For measuring hardness, especially of metals, there is known, among others, the Rockwell apparatus, that operates by means of a conical diamond point with a 120 degree angle which is brought to rest on the test-piece with a predetermined load, referred to as pre-load, whereafter an additional load is applied. The difference in penetration registered under the two loads determines the hardness of the test-piece. In this apparatus the assembly applying the loads, and the assembly measuring the depth of penetration constitute two separate units.

According to the present invention, both said functions of applying loads, and of measuring the depth of penetration, are performed by a single arrangement which comprises a chamber which includes a diaphragm that is connected with the diamond point. Said chamber is filled with a heavy fluid (as for instance mercury or quicksilver) and communicates through a flexible hose (for instance a rubber hose) with a capillary glass tube extending in the horizontal plane. The heavy liquid, in a static condition, fills part of the capillary tube which is mounted on a slide vertically shiftable along a guiding post, there being provided, near or over the capillary tube a scale graduated according to the hardness system used.

The appended drawing represents diagrammatically and in the way of a non-limiting example some forms of embodiment of the measuring arrangement according to the invention, and namely:

Figure 1:
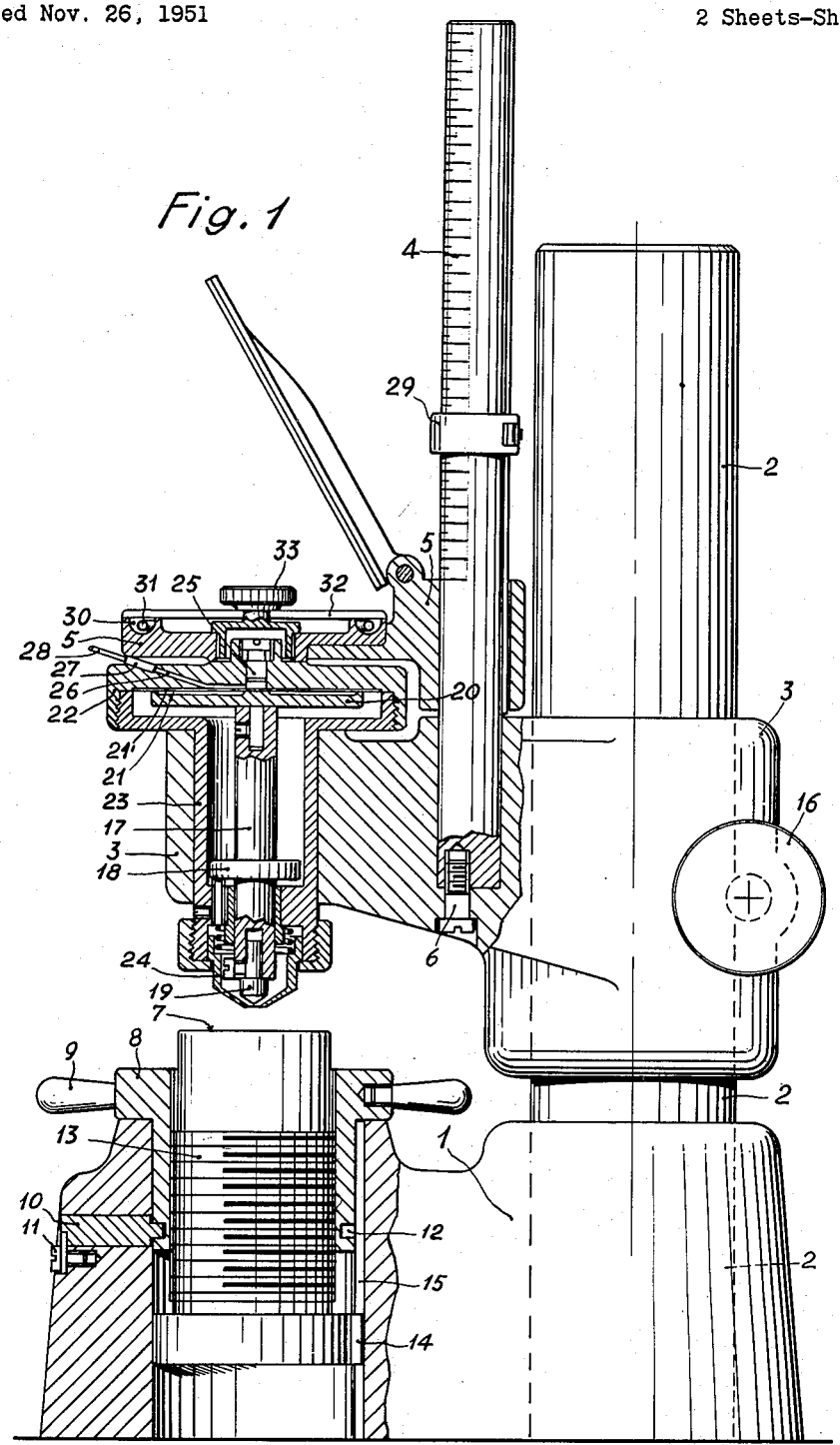
Fig. 1 is a side view of the measuring arrangement, partially in section.

As it is apparent from Fig. 1, the hardness measuring arrangement, especially at the lower loads, according to the present invention, comprises a base 1 and, fast to same, a post or rod 2, functioning as a guide for the vertical displacement of the load applying and penetration measuring means 3 which is slidably mounted on post 2. The smaller post 4, which too serves as a vertical guide for the slider 5, is mounted fast to the means 3, by means of a screw 6.

The base 1 comprises, besides the means for holding said post 2, a device for the micrometric vertical displacement of the resting table 7. Said arrangement comprises, according to the present example of embodiment, a sleeve 8 rotatable about its vertical axis and provided with jutting knobs 9, to effect the hand-controlled rotation of said sleeve. In the figure as shown, the sleeve 8 is prevented from axial movement by a key 10 secured on the base with a screw 11 and engaging in a circular groove 12 of said sleeve. A cylinder 13, carrying the resting table 7, is coaxial and internal with respect to the sleeve 8, and presents an outer thread that engages with an internal thread on said sleeve. On the upper end of the cylinder 13 there is mounted the rest table 7, while its lower end presents a lug 14 that extends radially until it engages in the vertical slide guide 15 to prevent the cylinder 13 from rotating about its own axis though allowing same to move axially.

The load applying and measuring means 3, movable vertically along post 2, comprises, besides the smaller post 4 fixed thereon by means of a screw 6, and on which is movable the slide 5, a (micrometric) screw 16 for the greater vertical displacements of the means 3 in respect to the post 2, and an arrangement for effecting the penetration and the measurement of the difference in penetration depth, comprising a diamond carrying rod 17, provided with a flange 18, that defines the inoperative position of the diamond 19. The rod 17 is slidably mounted at its lower end, while at its upper end there is mounted a circular plate 20 that contacts, during the measurement operation, the lower surface of a diaphragm 21. Said diaphragm functions as the lower end wall of a chamber 21' containing quicksilver or mercury or another heavy liquid, the upper wall whereof is formed by a cover 22 screwed on the cylindrical supporting body 23 which supports cover 22 and slidably supports the rod 17 and the sleeve 24, fixed on the slide 3. The cover 22 and body 23 form a casing which together with diaphragm 21 provides the chamber 21'. The cylindrical supporting body 23 carries, resiliently assembled on its lower end, a protective cap 24, having a hole at its bottom for the diamond 19. The cover 22 is provided with an axial aperture 25 having suitable closure means for filling and emptying of the liquid and with a duct 26 connecting the chamber 21' to tap 27 which in turn is connected to flexible hose 28. The other end (not shown) of flexible hose or tube 28 is coupled with capillary tube 31 which is associated with a graduated scale (on dial 32), to measure the readings.

The small post 4, fixed to the means 3 by means of a screw 6, is provided with a stop 29 and with a scale graduated in kilograms.

The slide 5, which is vertically slidable along the guiding post 4, comprises: a circular groove 30 positioned in the horizontal plane containing the capillary tube 31 developed in the shape of a ring, and connected with the chamber 21', containing quicksilver or other heavy liquid, by means of the flexible hose 28, as already stated above; a circular graduated scale 32, placed over the capillary tube 31 in the horizontal plane, and rotatable about its axis, which coincides with the axis of the ring formed by the capillary tube 31; a knob 33, to effect manually the rotation of the circular dial; a mirror pivotally hinged at 5' on the slide 5, so as to allow, when properly inclined, the reading of the graduated circular dial 32.

Figure 2:
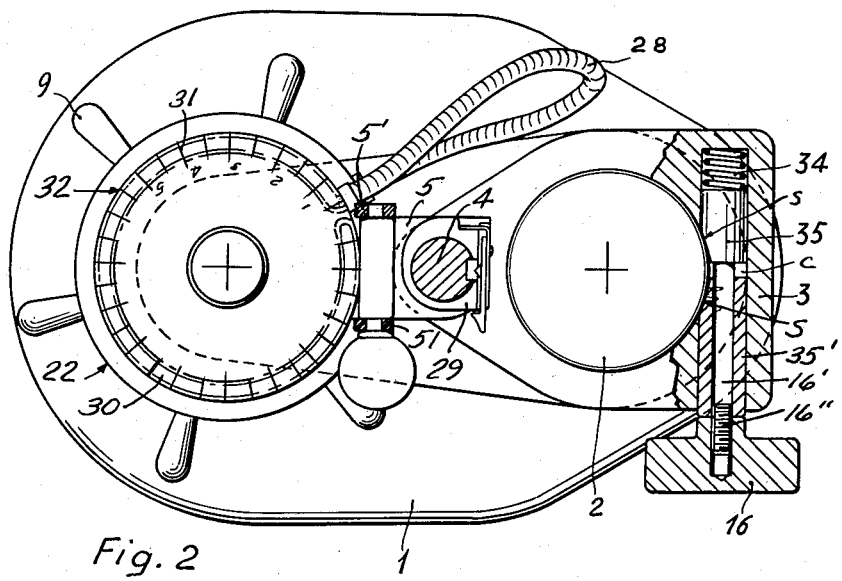
Fig. 2 is a plan view of the same apparatus, also partially sectioned.

In Fig. 2 there is visible in section the screw device which includes knob 16, screw 16" and rod 16', for the larger vertical displacements of the means 3, in respect to the guiding post 2. The spring 34 has the function of urging the portion 35 against the post 2 to prevent the sliding downwards of the slide 3 by effect of the force of gravity. Portions 35 and 35' are provided with chamferings S tangent to the circumference of the cylinder 2. Rotation of the knob 16 in one direction draws parts 35 and 35' together tending to close the gap c between these parts.

Figure 3:
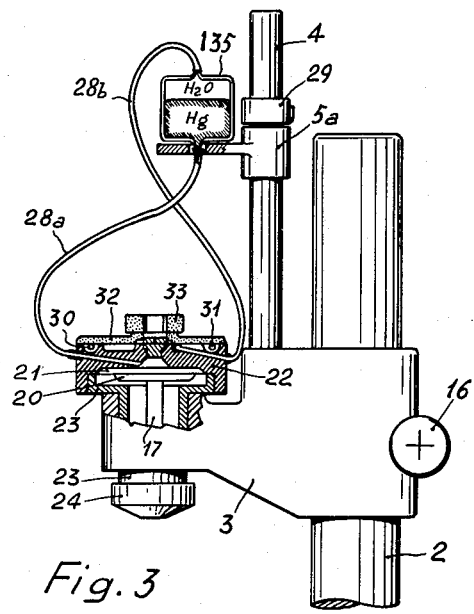
Fig. 3 is a diagrammatic vertical section of the upper portion of the hardness measuring apparatus, that illustrates a variant of the present invention.

Fig. 3 represents a variant in respect to the type of embodiment described above.

While the foot and the annexed micrometric device for the vertical displacement of the resting table, and the post 2 functioning as a vertical guide for the slide 3, remain unchanged, the arrangement for effecting the penetration and the measurement of the depth differential differs in Fig. 3 in the following way. The capillary tube 31 has a circular graduated dial 32 and a further slide 5a which is slidably mounted on post 4 to serve as a vertical displacement guide. A vessel or enlarged tube 135 is mounted on said slide and contains mercury or other heavy fluid in its lower portion and water or other lighter fluid in its upper portion. The said lighter fluid may be colored. Flexible hose 28a connects the bottom opening of vessel 135 to the chamber 21'. Flexible hose 28b connects the top portion of vessel 135 to the capillary tube 31 which in this case is held in means 3.

To effect the measurement by means of the apparatus according to Figs. 1 and 2, the test-piece is initially placed on the resting table 7 and, by manipulating the knobs 9 the sleeve 8 is made to rotate and the cylinder 13 is axially displaced upwardly thus pressing the test-piece against the diamond point until the mercury meniscus inside the capillary tube 31 is brought to the upper limit of the scale.

This having been done, the rotatable dial 32 is made to rotate until a notch on said dial is brought in correspondence with said meniscus. At this point, the slide 5 is raised by displacing it along the small post 4, acting as a slide guide, as far as it is allowed by the stop 29, which position corresponds to a predetermined load on the diamond point (15, or 20, or 30 kilos) and therefore to a corresponding penetration of said point, the depth whereof depends naturally on the hardness of the test-piece. Said load acting on the test piece through the diamond point is applied to the diamond point through the diaphragm 21, the plate 20 and the rod 17 in the form of a hydrostatic head. By then bringing back the slide to the initial resting position, the quicksilver meniscus inside the capillary tube 31 will not be anymore in correspondence with the same notch on the rotatable circular dial 32, but will now be displaced in respect to said notch as a function of the farther penetration of the diamond point in the test-piece metal. Said farther penetration is obviously the penetration differential between the maximum depth of the penetration due to the hydrostatic total head of the quicksilver, when the slide has reached its higher position, and the initial depth due to the hydrostatic head of the quicksilver when the slide 5 is in its lower position, resting on the means 3 (pre-load). The distance of the meniscus from the first mentioned notch on the graduated circular dial at the end of the operation described above, will therefore measure, according to the Rockwell system, the hardness of the test-piece, thus solving the problem which the present invention had proposed to solve.

To effect the measurement by means of the modified arrangement according to the variant represented diagrammatically in Fig. 3, one precedes initially in a way quite similar to the preceding instance, until there is reached the situation wherein the meniscus of the coloured water contained in the capillary tube 31 is in register with a certain notch on the graduated circular dial 32, the slide 5a being in its lower position resting on means 3. The slide 5a is then raised together with the vessel 135 mounted thereon, as far as the highest position, that is when said slide engages with the stop 29, which has been previously set in a predetermined position on the small post 4, in relation to the load it is wanted to apply to the diamond point. The load will then depend in this instance also on the difference in specific gravity between the underlying heavier liquid and that of the overlying lighter fluid, and this shall have to be accounted for.

Finally, the slide 5a will be returned to its lower position and a reading will be taken of how much the water meniscus in the capillary tube 31 has moved from the aforementioned notch of the circular graduated dial 32. Said distance measures even in this instance the depth of penetration of the diamond after the second load application, that is the penetration differential with the pre-load and with the secondary load, and measures therefore, according to the Rockwell system, the hardness degree of the test-piece.

This variant has the advantage of avoiding the displacement of the capillary tube carrying slide, that by remaining stationary allows a far higher accuracy of measurement, and further of requiring the displacement of a much lighter and handy piece. In this instance the load is determined, as already stated, by the difference in specific gravity between the two liquids, which operate in the apparatus, quicksilver and water, of which one fills the diaphragm chamber 21' and the other the capillary tube 31.

What I claim is:

1. In a hardness measuring apparatus of the type having a hard tip for penetrating into the material the hardness of which is to be determined, the improved structure comprising a single unit adapted to measure the depth of penetration and to determine the load applied, said unit comprising a casing having a chamber, a diaphragm closing one end of said chamber, means outside of said chamber and adjacent a central portion of said diaphragm for transmitting the movement of the latter to the hard tip, a pressure applying and penetration measuring means including at least one flexible tube, and a capillary, transparent, horizontal tube communicating with a first end of the flexible tube, the other end of said flexible tube being attached to said casing and communicating with said chamber, slide means attached to a portion of said pressure applying and penetration measuring means adjacent said first end of the flexible tube for moving said portion of the pressure applying and penetration measuring means vertically with respect to said casing and chamber, a vertically extending means adapted to adjustably hold said slide means in any one of a number of positions, a heavy liquid filling said chamber and said flexible tube and extending at least up to said portion held by the slide means, liquid extending into said capillary transparent horizontal tube and a scale means adjacent the latter.

2. The device as set forth in claim 1 in which said portion of the pressure applying and penetration measuring means held by said slide means includes a vessel, means for attaching said flexible tube to the lower end of said vessel, a second flexible tube having the upper end thereof communicatively attached to the upper portion of said vessel and the lower end thereof attached to an end of said capillary transparent horizontal tube, the liquid contained in said capillary tube being different and of lighter weight than the liquid of said chamber and the first flexible tube, said lighter liquid extending from upper portion of said heavy liquid through said vessel and said second flexible tube.

3. The device as set forth in claim 1, in which the tube held by said slider element comprises a horizontal portion which is capillary, a curved and horizontal scale means associated with said curved tube portion, a vertical post adapted to guide said slider to anyone of a number of positions and graduations on said vertical post to determine the pressure applied by lifting said slider.

4. In a hardness measuring apparatus of the type having a diamond tip for penetrating into the material the hardness of which is to be determined, the improved structure comprising a single unit adapted to measure the depth of penetration and the load applied, said unit comprising a casing having a chamber, a diaphragm closing one end of said chamber, means outside of said chamber and adjacent said diaphragm for transmitting the movement of the latter to the diamond tip, a tube having one end connected to said chamber, a slider device movable vertically with respect to said casing, vertically extending means adapted to adjustably hold said slider device in any one of a number of positions, a tube held at at least one end thereof by said slider device, a flexible tube connecting said tube of said slider with the other end of the tube connected to said chamber, said chamber containing a heavy liquid which extends upwardly into and fills said flexible tube, said tube in said slider containing liquid, the position of which is determined by the liquid in said flexible tube and chamber, whereby said slider means can be lifted to impose a predetermined desired pressure upon said diaphragm and diamond and the change in position of the meniscus of the liquid in the tube held by said slider can be measured to determine the depth of penetration.

5. The device as set forth in claim 4 in which the tube held by said slider element comprises a horizontal end portion which is curved, and scale means positioned to extend adjacent to and along said curved tube portion.

6. The device as set forth in claim 4 comprising supporting means adapted to hold said casing, a sleeve slidably mounted on said supporting means and surrounding the diamond tip portion of said device, said sleeve being slidable axially and having an axial opening from which the diamond may project, and spring means holding said sleeve in a position to protect said diamond when no measurement is being taken.

7. The device as set forth in claim 4 comprising a slidably mounted sleeve surrounding the diamond tip portion of said device, said sleeve being slidable axially and having an axial opening from which the diamond may project; and spring means holding said sleeve in a position to protect said diamond when no measurement is being taken.

References Cited in the file of this patent

UNITED STATES PATENTS

| 1,320,748 | Fisher | Nov. 4, 1919 |
| 1,423,293 | Amsler | July 18, 1922 |
| 1,887,850 | Bonney et al. | Nov. 15, 1932 |
| 2,536,632 | Ernst | Jan. 2, 1951 |

FOREIGN PATENTS

| 594,548 | Great Britain | Nov. 13, 1947 |
| 617,465 | Great Britain | Feb. 7, 1949 |